(12) United States Patent
Shi et al.

(10) Patent No.: US 12,566,902 B2
(45) Date of Patent: Mar. 3, 2026

(54) YIELD RATE PREDICTION METHOD IN MANUFACTURE OF INTEGRATED CIRCUIT WAFER

(71) Applicant: Shanghai Glorysoft Co., Ltd, Shanghai (CN)

(72) Inventors: Weitang Shi, Shanghai (CN); Wenrui Wang, Shanghai (CN); Ziming Ceng, Shanghai (CN); Yue Cao, Shanghai (CN)

(73) Assignee: Shanghai Glorysoft Co., Ltd, Shanghai (CN)

( * ) Notice: Subject to any disclaimer, the term of this patent is extended or adjusted under 35 U.S.C. 154(b) by 1083 days.

(21) Appl. No.: 17/627,695

(22) PCT Filed: Jun. 1, 2021

(86) PCT No.: PCT/CN2021/097610
§ 371 (c)(1),
(2) Date: Jan. 17, 2022

(87) PCT Pub. No.: WO2021/244510
PCT Pub. Date: Dec. 9, 2021

(65) Prior Publication Data
US 2022/0245301 A1     Aug. 4, 2022

(30) Foreign Application Priority Data
Jun. 2, 2020    (CN) .......................... 202010491650.6

(51) Int. Cl.
*G06F 30/20*          (2020.01)
*G06F 111/10*         (2020.01)
*G06F 119/22*         (2020.01)

(52) U.S. Cl.
CPC .......... *G06F 30/20* (2020.01); *G06F 2111/10* (2020.01); *G06F 2119/22* (2020.01)

(58) Field of Classification Search
CPC ... G06F 30/20; G06F 2119/22; G06F 2111/10
(Continued)

(56) References Cited

U.S. PATENT DOCUMENTS 5,777,901 A * 7/1998 Berezin ................... H01L 22/20
                                                      716/56
6,610,550 B1 * 8/2003 Pasadyn .................. H01L 22/20
                                                      438/15

(Continued)

FOREIGN PATENT DOCUMENTS

| CN | 105225979 | 1/2016 |
| CN | 109426655 | 3/2019 |

(Continued)

OTHER PUBLICATIONS

Jang et al. (A Wafer Map Yield Prediction Based on Machine Learning for Productivity Enhancement, IEEE 2019, pp. 400-407) (Year: 2019).*

(Continued)

*Primary Examiner* — Iftekhar A Khan
(74) *Attorney, Agent, or Firm* — JCIP GLOBAL INC.

(57)          ABSTRACT

The invention provides a yield rate prediction method for manufacture of integrated circuit wafers, which includes the following steps: obtaining candidate reference product models; obtaining parameters of the candidate reference products; obtaining functions of candidate reference products; predicting candidate reference products; selecting a final reference product; obtaining a new product prediction model; and predicting yield rate of new product. The yield rate prediction method for manufacture of integrated circuit wafer provided by the disclosure is performed based on the functional relationship between random defect density and yield rate in wafer manufacturing. By referring to the yield rate data of mature products on the production line, establishing data model and performing regression analysis, a (Continued)

more accurate yield rate prediction value of a new product can be obtained, thus providing a new product yield rate prediction method for manufacture of semiconductor integrated circuit wafers.

10 Claims, 3 Drawing Sheets

(58) Field of Classification Search
USPC ............................................................. 703/2
See application file for complete search history.

(56) References Cited

U.S. PATENT DOCUMENTS

| | | | | |
|---|---|---|---|---|
| 6,751,519 | B1 * | 6/2004 | Satya ........................ | H01L 22/34 |
| | | | | 702/182 |
| 7,013,441 | B2 * | 3/2006 | Bickford ................. | G06F 30/30 |
| | | | | 716/54 |
| 7,117,057 | B1 * | 10/2006 | Kuo ................. | G05B 19/41875 |
| | | | | 700/121 |
| 7,792,595 | B1 * | 9/2010 | Bomholt ................. | G06F 30/20 |
| | | | | 700/29 |
| 7,873,585 | B2 * | 1/2011 | Izikson ............... | G03F 7/70625 |
| | | | | 706/21 |
| 8,374,839 | B2 * | 2/2013 | Satoh .................... | G06F 30/367 |
| | | | | 703/2 |
| 9,087,176 | B1 * | 7/2015 | Chang ....................... | G03F 1/36 |
| 9,470,743 | B2 * | 10/2016 | Callegari ................ | H01L 22/14 |
| 9,483,602 | B2 * | 11/2016 | McConaghy ....... | G06F 30/3308 |
| 10,018,996 | B2 * | 7/2018 | Bomholt .......... | G05B 19/41885 |
| 10,430,719 | B2 * | 10/2019 | David ..................... | G03F 7/705 |
| 10,614,186 | B2 * | 4/2020 | Kim ....................... | G06N 3/084 |
| 10,734,293 | B2 * | 8/2020 | David ................ | G03F 7/70633 |
| 11,982,980 | B2 * | 5/2024 | Kim ...................... | G06F 30/27 |
| 11,994,845 | B2 * | 5/2024 | Roy ..................... | G06N 3/0442 |
| 2002/0072872 | A1 * | 6/2002 | Chatterjee ............... | H01L 22/20 |
| | | | | 257/E21.525 |
| 2006/0128039 | A1 * | 6/2006 | Lin ......................... | H01L 22/20 |
| | | | | 257/E21.525 |
| 2007/0288219 | A1 * | 12/2007 | Zafar .................. | G06T 7/0008 |
| | | | | 703/14 |
| 2008/0262793 | A1 * | 10/2008 | Subramaniam .... | G01R 31/2894 |
| | | | | 702/179 |
| 2009/0005894 | A1 * | 1/2009 | Bomholt ................. | G06F 30/20 |
| | | | | 703/7 |
| 2010/0049680 | A1 * | 2/2010 | Huang ............... | G03F 7/70633 |
| | | | | 706/16 |
| 2011/0112999 | A1 * | 5/2011 | Lee ........................ | H01L 22/20 |
| | | | | 706/20 |
| 2011/0172806 | A1 * | 7/2011 | Matsumoto ............ | G11C 29/54 |
| | | | | 700/110 |
| 2013/0054186 | A1 * | 2/2013 | Den Boef ............. | H01L 23/544 |
| | | | | 702/150 |
| 2013/0080125 | A1 * | 3/2013 | Baseman ......... | G05B 19/41875 |
| | | | | 703/2 |
| 2014/0223389 | A1 * | 8/2014 | Liao ............... | G01R 31/318558 |
| | | | | 716/112 |
| 2015/0095729 | A1 * | 4/2015 | Goel ............. | G01R 31/318513 |
| | | | | 714/726 |
| 2015/0248127 | A1 * | 9/2015 | Yang ....................... | H01L 22/20 |
| | | | | 700/121 |
| 2015/0253373 | A1 * | 9/2015 | Callegari ........... | G01R 31/2601 |
| | | | | 702/58 |
| 2015/0371134 | A1 * | 12/2015 | Chien ................ | G05B 23/0294 |
| | | | | 706/21 |
| 2016/0148850 | A1 * | 5/2016 | David ....................... | G06N 7/01 |
| | | | | 355/53 |
| 2016/0162779 | A1 * | 6/2016 | Marcus .................. | G06N 20/10 |
| | | | | 706/12 |
| 2016/0224705 | A1 * | 8/2016 | Joshi ....................... | G06F 30/20 |
| 2017/0109646 | A1 * | 4/2017 | David ................. | G03F 7/70625 |
| 2018/0349538 | A1 * | 12/2018 | Bhosale ................. | G06N 5/025 |
| 2018/0356807 | A1 * | 12/2018 | Honda ............ | G05B 19/41885 |
| 2019/0064253 | A1 * | 2/2019 | David ....................... | G06N 3/09 |
| 2019/0065630 | A1 * | 2/2019 | Kim ........................ | G06F 17/18 |
| 2019/0286983 | A1 * | 9/2019 | Jung ...................... | G05B 17/02 |
| 2019/0361358 | A1 * | 11/2019 | Tel ..................... | G03F 7/70683 |
| 2019/0385047 | A1 * | 12/2019 | Lei ........................... | G06N 3/10 |
| 2019/0385695 | A1 * | 12/2019 | Jeong ............ | G01R 31/318511 |
| 2020/0082051 | A1 * | 3/2020 | Kwon .................... | G06N 3/045 |
| 2021/0042644 | A1 * | 2/2021 | Blanton ................. | G06F 30/27 |
| 2022/0076146 | A1 * | 3/2022 | Hong ...................... | G06N 20/00 |

FOREIGN PATENT DOCUMENTS

| | | |
|---|---|---|
| CN | 109636026 | 4/2019 |
| CN | 111667111 | 9/2020 |

OTHER PUBLICATIONS

Melhem et al. (Regression Methods for Predicting the Product's Quality in the Semiconductor Manufacturing Process, IFAC—PapersOnLine 49-12 (2016) 083-088) (Year: 2016).*

"International Search Report (Form PCT/ISA/210) of PCT/CN2021/097610", mailed on Aug. 27, 2021, with English translation thereof, pp. 1-4.

* cited by examiner

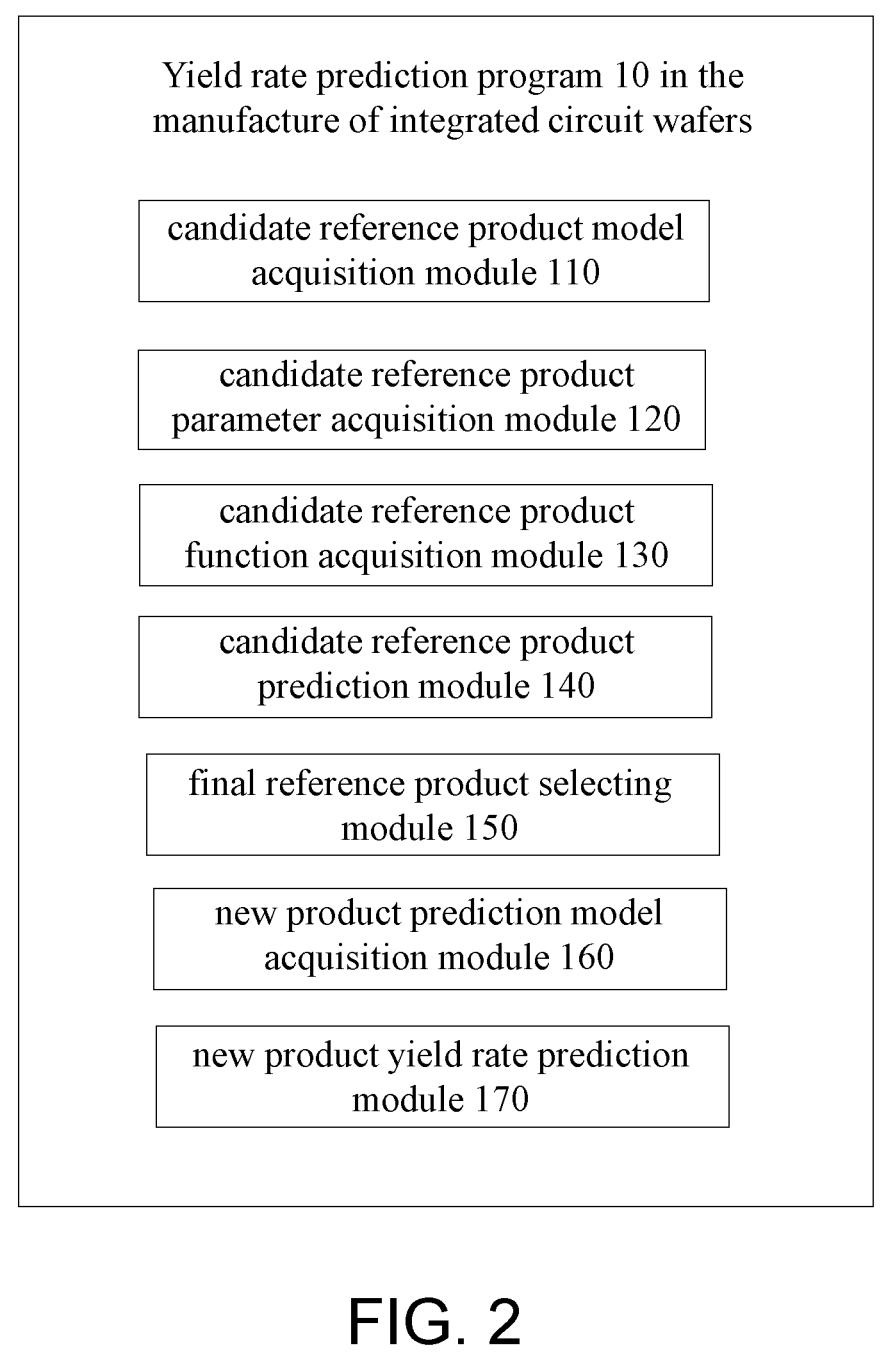

Yield rate prediction program 10 in the manufacture of integrated circuit wafers candidate reference product model acquisition module 110 candidate reference product parameter acquisition module 120 candidate reference product function acquisition module 130 candidate reference product prediction module 140 final reference product selecting module 150 new product prediction model acquisition module 160 new product yield rate prediction module 170

FIG. 2

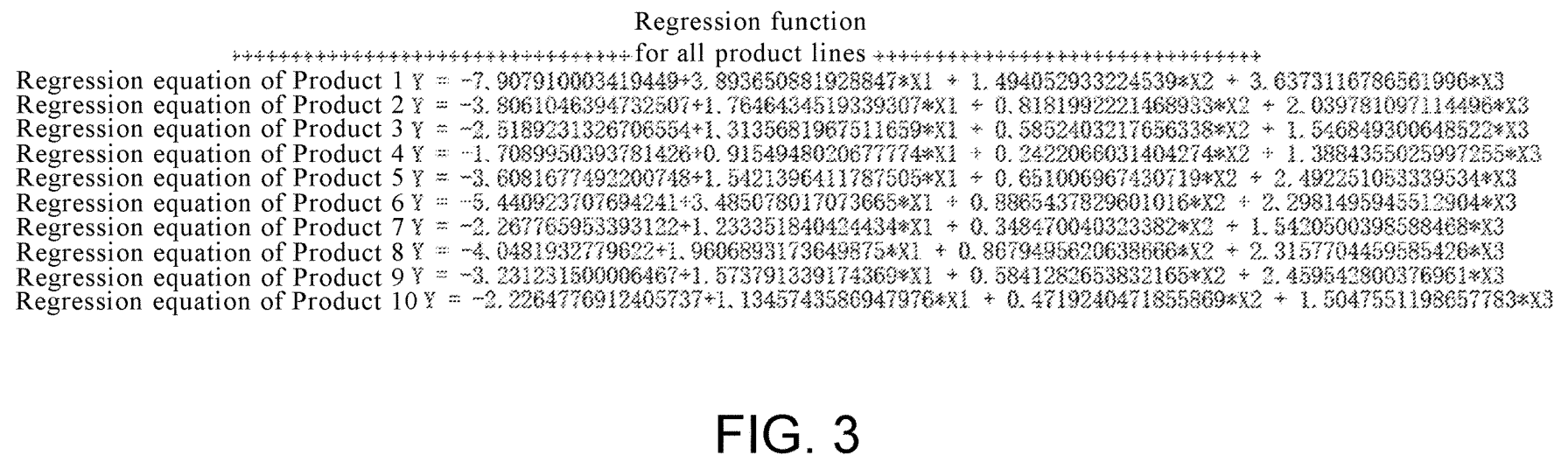

Regression function

+++++++++++++++++++++++++++++++++++++for all product lines ++++++++++++++++++++++++++++++++++++++++++++

Regression equation of Product 1 Y = -7.9079100034194449+3.8936508819288847*X1 + 1.4940529333224539*X2 + 3.6373116786301996*X3

Regression equation of Product 2 Y = -3.8061046394732507+1.7646434519339307*X1 + 0.8181992221468933*X2 + 2.0397810971114496*X3

Regression equation of Product 3 Y = -2.3189231326706554+1.3135681967511659*X1 + 0.5852403217656038*X2 + 1.5468493006048522*X3

Regression equation of Product 4 Y = -1.7089950393781426+0.9154948020677774*X1 + 0.2422068603140427*X2 + 1.3884355025997255*X3

Regression equation of Product 5 Y = -3.6081677492200748+1.5421396411787505*X1 + 0.6510069674307197*X2 + 2.4922510533395347*X3

Regression equation of Product 6 Y = -5.44082370768424 1~3.485078017073665*X1 + 0.8865437829601016*X2 + 2.2981495945512904*X3

Regression equation of Product 7 Y = -2.2077650533393122+1.2333518404244347*X1 + 0.3484700403233827*X2 + 1.5420500039855846*X3

Regression equation of Product 8 Y = -4.0481932779622+1.9606893173649875*X1 + 0.8679495820638866*X2 + 2.3157704459585426*X3

Regression equation of Product 9 Y = -3.2312315800006467+1.5737913391743867*X1 + 0.5841282653382165*X2 + 2.4595423800376961*X3

Regression equation of Product 10 Y = -2.2264776912405737+1.1345743586947976*X1 + 0.4719240471855809*X2 + 1.5047551198657783*X3

FIG. 3

YIELD RATE PREDICTION METHOD IN MANUFACTURE OF INTEGRATED CIRCUIT WAFER

CROSS-REFERENCE TO RELATED APPLICATION

This is a 371 application of the International PCT application serial no. PCT/CN2021/097610, filed on Jun. 1, 2021, which claims the priority benefits of China Application No. 202010491650.6 filed on Jun. 2, 2020. The entirety of each of the above-mentioned patent applications is hereby incorporated by reference herein and made a part of this specification.

TECHNICAL FIELD

The disclosure relates to a yield rate prediction method in the manufacture of integrated circuit wafers.

BACKGROUND TECHNIQUE

In the manufacturing process of semiconductor integrated circuit wafer, especially in the development process of new product, the yield rate of new products has a key impact on the initial cost budget and output value. The manufacture of semiconductor integrated circuit wafer not only involves complicated programs and steps but also many types of products. There is a considerable degree of uncertainty and subjective empirical factors in the prediction of yield rate of new products. Due to the inability to accurately predict the yield rate of new products, it prolongs the decision-making time in the early stage of production and manufacturing, increases the time and other related costs for production, and leads to the inability to accurately estimate the corresponding output value before the decision is made to develop new products and put it into production.

SUMMARY OF THE DISCLOSURE

The disclosure is carried out in order to solve the above problems. The disclosure provides a method for predicting yield rate in manufacture of integrated circuit wafer. Based on the functional relationship between random defect density and yield rate in manufacture of wafer, by referring to the yield rate data of mature products on the production line, establishing data model and performing regression analysis, it is possible to achieve a relatively accurate prediction value for yield rate of new products, which provides a prediction method for yield rate of new product in the manufacture of semiconductor integrated circuit wafer.

In order to achieve the above purpose, the disclosure provides a yield rate prediction method in manufacture of integrated circuit wafer, which has the following characteristics and includes the following steps:

obtaining candidate reference product models: a first quantity of candidate reference products are selected from a reference product library, and the full adjustment factor linear regression equation based on each of the candidate reference products is obtained according to a first preset rule;

obtaining parameters of the candidate reference products: each of yield rate influence factors of each of the candidate reference products is obtained respectively;

obtaining functions of candidate reference products: the full coordination factor linear function of each of the candidate reference products is obtained according to the respective yield rate influence factors and the full adjustment factor linear regression equation, and a yield rate prediction model is modified according to each of the candidate reference products;

predicting candidate reference products: the predicted yield rate of each of other candidate reference products is obtained from each of the modified yield rate prediction models based on the current candidate reference product. The overall yield rate error value based on each of the candidate reference products is obtained according to a second preset rule. Full coordination factor linear function correlation coefficients based on each of the candidate reference products are obtained according to a third preset rule;

selecting final reference product: the candidate reference product with the smallest overall yield rate error value or the full coordination factor linear function correlation coefficient closest to 1 is selected as the final reference product;

obtaining a new product prediction model: a new product prediction model based on the final reference product is obtained according to a full adjustment factor linear function based on the final reference product;

predicting yield rate of new product: a yield rate prediction result of new product is obtained according to the new product yield rate prediction model and the yield rate influence factor of the new product.

In addition, the yield rate prediction method in manufacture of integrated circuit wafer provided by the disclosure also features that the first preset rule is:

$$Y_e = e^{-\lambda_e}$$

In the equation, $Y_e$ is the actual yield rate of the candidate reference product e, and $\lambda_e$ is the average number of defects of the wafer corresponding to the candidate reference product e.

In addition, the yield rate prediction method in manufacture of integrated circuit wafer provided by the disclosure also features that the yield rate influence factor includes the number of mask layers, chip area, and minimum line width of the reference product.

Moreover, the yield rate prediction method in manufacture of integrated circuit wafer provided by the disclosure also features that the linear regression equation $\sigma$ of the full adjustment factor is:

$$\sigma = -\ln Y/\lambda_e = f(X_1, X_2, X_3, \ldots) = b = b + k_1 X_1 + k_2 X_2 + k_3 X_3 + \ldots,$$

In the equation, b is a constant term; $X_1$, $X_2$, and $X_3$ are respectively the variable terms $$\frac{N}{N_e}, \frac{A}{A_e}, \text{ and } \frac{W_e}{W}$$

related to each of the yield rate influence factors.

$$\frac{N}{N_e}$$

is the variable term corresponding to the ratio of the number of mask layers N of the current product to the number of mask layers $N_e$ of the reference product.

$$\frac{A}{A_e}$$

is the variable term corresponding to the ratio of the chip area A of the current product to the chip area $A_e$ of the reference product.

$$\frac{W_e}{W}$$

is the variable term corresponding to the ratio of the minimum line width $W_e$ of the reference product to the minimum line width W of the current product.

$k_1$ is the linear regression coefficient corresponding to variable $X_1$, $k_2$ is the linear regression coefficient corresponding to variable $X_2$, and $k_3$ is the linear regression coefficient corresponding to variable $X_3$.

Additionally, the yield rate prediction method in manufacture of integrated circuit wafer provided by the disclosure also features that the full coordination factor linear function is:

$$\sigma = -\ln Y / \lambda_e$$

$$= f\left(\frac{N}{N_e}, \frac{A}{A_e}, \frac{W_e}{W}, \dots\right)$$

$$= b + k_1\left(\frac{N}{N_e}\right) + k_2\left(\frac{A}{A_e}\right) + k_3\left(\frac{W_e}{W}\right) + \dots .$$

Furthermore, the yield rate prediction method in manufacture of integrated circuit wafer provided by the disclosure also features that the modified yield rate prediction model is:

$$\hat{Y}_i = e^{-\sigma_i \lambda_e} = e^{\sigma_i \ln Y_e}$$

In the equation, $\hat{Y}_i$ is a predicted yield rate of a product i based on the candidate reference product e, $\sigma_i$ is the full adjustment factor of the product i based on the candidate reference product e, and $Y_e$ is the actual production yield rate of the candidate reference product e.

Moreover, the yield rate prediction method in manufacturing of integrated circuit wafer provided by the disclosure also features that the second preset rule is: an overall yield rate error value d based on the current candidate reference product is:

$$d = \sqrt{\frac{1}{N}\sum_{i=1}^{N}(z_i - \mu)^2}$$

$$= \sqrt{\frac{1}{N}\sum_{i=1}^{N}\left((\hat{Y}_i - Y_i) - \frac{1}{N}\sum_{i=1}^{N}|\hat{Y}_i - Y_i|\right)^2}$$

In the equation, N is the total quantity of the other candidate reference products, $z_i$ is the difference between the predicted yield rate $\hat{Y}_i$ and actual yield rate $Y_i$ of other candidate reference products i, and $\mu$ is the total average value of the difference between the respective predicted yield rates and actual yield rates of all the other candidate reference products.

Furthermore, the yield rate prediction method in manufacture of integrated circuit wafer provided by the disclosure also features that the third preset rule includes: a full coordination factor linear function correlation coefficient R based on each of the candidate reference products is:

$$R = \sqrt{1 - \frac{\sum_{i=1}^{N}(\hat{Y}_i - Y_i)^2}{\sum_{i=1}^{N}(Y_i - \overline{Y})^2}}$$

In the equation, the average value of the actual yield rate of all the other candidate reference products is $$\overline{Y} = \frac{1}{N}\sum_{i=1}^{N}Y_i.$$

Moreover, the yield rate prediction method in manufacture of integrated circuit wafer provided by the disclosure also has features that the preset evaluation rule is: the overall error value between the predicted yield rate of the other candidate reference products and the actual yield rate is the smallest.

Additionally, in order to achieve the above-mentioned purpose, the disclosure further provides an electronic device which is characterized as follows. The electronic device includes a memory and a processor. The memory stores a yield rate prediction program for the manufacture of integrated circuit wafers. When the yield rate prediction program for the manufacture of the integrated circuit wafer is executed by the processor, the following steps are implemented:

obtaining candidate reference product models: a first quantity of candidate reference products are selected from a reference product library, and the full adjustment factor linear regression equation based on each of the candidate reference products is obtained according to a first preset rule;

obtaining parameters of the candidate reference products: each of yield rate influence factors of each of the candidate reference products is obtained respectively;

obtaining functions of candidate reference products: the full coordination factor linear function of each of the candidate reference products is obtained according to the respective yield rate influence factors and the full adjustment factor linear regression equation, and a yield rate prediction model is modified according to each of the candidate reference products;

predicting candidate reference products: the predicted yield rate of each of the candidate reference products is obtained from each of the modified yield rate prediction models based on the current candidate reference product. The yield rate error value of each of the candidate reference products is obtained according to the difference between each of the predicted yield rates and each of the actual yield rates;

selecting final reference product: the candidate reference product with the smallest yield rate error value is selected as the final reference product;

obtaining a new product prediction model: a new product prediction model based on the final reference product is obtained according to a full adjustment factor linear function based on the final reference product;

predicting yield rate of new product: a yield rate prediction result of new product is obtained according to the new product yield rate prediction model and the yield rate influence factor of the new product.

Furthermore, the disclosure further provides a computer-readable storage medium having the following characteristics. The computer-readable storage medium stores a yield rate prediction program for the manufacture of the integrated circuit wafer. When the yield rate prediction program for manufacture of the integrated circuit wafer is executed by the processor, the steps of the yield rate prediction method for manufacture of integrated circuit wafer are realized.

Function and Effect of Disclosure

The yield rate prediction method for manufacture of integrated circuit wafer involved in the disclosure is performed based on the functional relationship between random defect density and yield rate in wafer manufacturing. By referring to the yield rate data of mature products on the production line, establishing data model and performing regression analysis, selecting suitable reference products, and obtaining a new product prediction model, prediction on the yield rate of a new product can be carried out. The method of the disclosure uses the mature product database on the existing production line of the manufacturing plant as the basis of the yield rate prediction model. The data is real and reliable, and can achieve relatively accurate yield rate prediction values of new products, reflect the actual production capability of the semiconductor wafer manufacturing plant. The method of the disclosure can establish a corresponding yield rate prediction model based on the product database of different plants, and therefore the method is universal for semiconductor wafer manufacturing plants.

The theoretical basis of this method is based on the correlation model function of the yield rate and the defect density in wafer manufacturing. Through modified Poisson model factor optimization, the accuracy of the yield rate prediction model is improved.

BRIEF DESCRIPTION OF THE DRAWINGS

In order to explain the embodiments of the disclosure or the technical solutions in the prior art more clearly, the following will briefly describe the drawings that need to be used in the description of the embodiments or the conventional technology. Clearly, the drawings in the following description are merely for some embodiments of the disclosure. For those of ordinary skill in the art, other drawings may be obtained based on the structure shown in these drawings without making inventive effort.

FIG. 2 is a program module diagram of an embodiment of a yield rate prediction program in the manufacture of integrated circuit wafers of the disclosure.

FIG. 3 is a screenshot of the yield rate prediction program in the manufacture of integrated circuit wafers of the disclosure.

Figure 1:
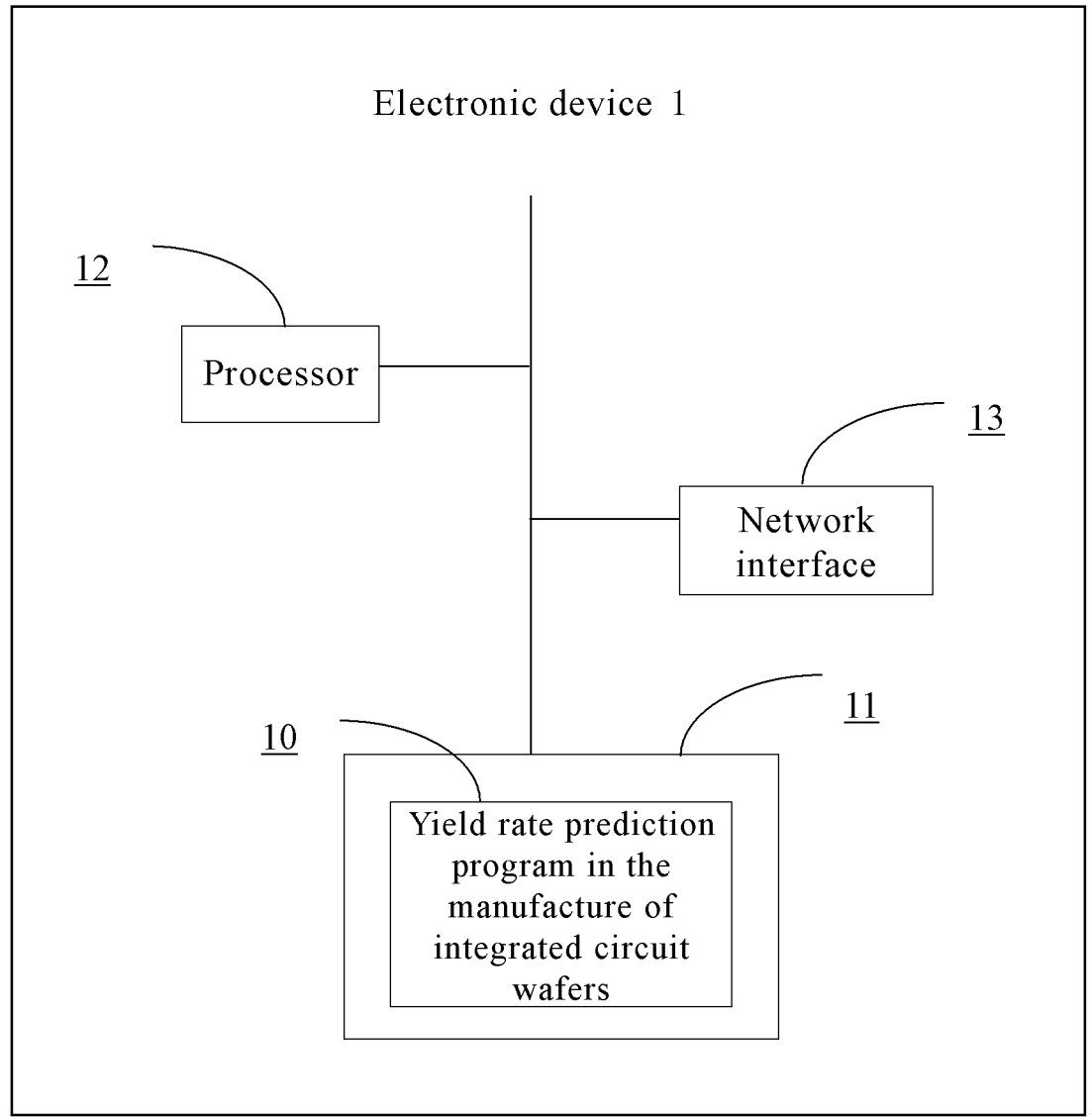
FIG. 1 is a schematic view of an embodiment of an electronic device of the disclosure.

The realization of the purpose, functional characteristics and advantages of the disclosure will be further described in conjunction with the embodiments and with reference to the accompanying drawings.

DESCRIPTION OF EMBODIMENTS

Hereinafter, a yield rate prediction method for the manufacture of integrated circuit wafers, a device, and a storage device related to the disclosure will be described in detail with reference to the accompanying drawings and embodiments. The principles and features of the disclosure will be described below with reference to the accompanying drawings. The examples cited are only used to explain the disclosure, and are not used to limit the scope of the disclosure.

FIG. 1 is a schematic view of an embodiment of an electronic device of the disclosure.

The disclosure provides an electronic device 1. Referring to FIG. 1, FIG. 1 is a schematic view of a preferred embodiment of the electronic device 1 of the disclosure.

In this embodiment, the electronic device 1 includes a memory 11, a processor 12, a network interface 13, and a communication bus. The communication bus is configured to realize the connection communication between these components.

The network interface 13 may include a standard wired interface and a wireless interface (such as a WI-FI interface).

The memory 11 includes at least one type of readable storage medium. The at least one type of readable storage medium may be a non-volatile storage medium such as flash memory, hard drive, multimedia card, card-type memory, and the like. In some embodiments, the readable storage medium may be an internal storage unit of the electronic device 1, for example, a hard drive of the electronic device 1. In other embodiments, the readable storage medium may also be an external storage device of the electronic device 1, such as a plug-in hard drive equipped on the electronic device 1, or a smart media card (SMC), a secure digital (SD) card, a flash card, etc.

In this embodiment, the readable storage medium of the memory 11 is generally configured to store the yield rate prediction program 10 and the like for the manufacture of integrated circuit wafers installed in the electronic device 1. The memory 11 can also be configured to temporarily store data that has been output or will be output.

In some embodiments, the processor 12 may be a central processing unit (CPU), a microprocessor or other data processing chip, which is used to run program codes or process data stored in the memory 11, such as executing a yield rate prediction program 10 for the manufacture of integrated circuit wafers.

FIG. 1 only shows the electronic device 1 with the components 11 to 13 and the yield rate prediction program 10 for the manufacture of integrated circuit wafers. However, it should be understood that it is not required to implement all the components that are shown, and more or fewer components may be implemented alternatively.

Optionally, the electronic device 1 may further include a user interface. The user interface may include a display and an input unit such as a keyboard. The optional user interface may further include a standard wired interface and a wireless interface.

Optionally, the electronic device 1 may also include a display. In some embodiments, the display may be an LED display, a liquid crystal display, a touch liquid crystal display, an organic light-emitting diode (OLED) touch device, and the like. The display is used to display the information that is processed in the electronic device and to display the visualized user interface.

FIG. 2 shows a program module diagram of an embodiment of a yield rate prediction program for manufacture of integrated circuit wafers of the disclosure.

In the device embodiment shown in FIG. 1, the memory 11, which is a computer storage medium, includes the yield rate prediction program 10 in the manufacture of integrated circuit wafers, and the processor 12 includes the following modules when executing the yield rate prediction program 10 in the manufacture of integrated circuit wafers stored in the memory 11: a candidate reference product model acquisition module 110; a candidate reference product parameter acquisition module 120; a candidate reference product function acquisition module 130; a candidate reference product prediction module 140; a final reference product selecting module 150; a new product prediction model acquisition module 160; and a new product yield rate prediction module 170.

As shown in FIG. 2, in this embodiment, the yield rate prediction program 10 in the manufacture of integrated circuit wafers may include and execute:

candidate reference product model acquisition module 110: a first quantity of candidate reference products are selected from a reference product library, and the full adjustment factor linear regression equation based on each of the candidate reference products is obtained according to a first preset rule.

In the disclosure, the reference product library may be composed of mature products already available on a production line. More specifically, in some embodiments, there are 10 mature products with different product specifications (product 1, product 2 . . . product 10) on the production line of a semiconductor integrated circuit wafer manufacturing plant. The 10 products can be used as the candidate reference products in the reference product library, from which the most suitable final reference product is selected. Each product has a different manufacturing process, product parameters and actual yield rate, which can be used as data for the reference library of yield rate models.

More specifically, in the yield rate prediction program for manufacture of integrated circuit wafer provided by the disclosure, a Poisson model for yield rate and defect density (number of defects) is first established according to a first preset rule.

The first preset rule is:

$$Y_e = e^{-\sigma_e}$$

In the equation, $Y_e$ is the actual yield rate of the candidate reference product e, and $\lambda_e$ is the average number of wafer defects corresponding to the candidate reference product e.

The average number of wafer defects $\lambda_e$ is related to the yield rate influence factor of the product.

Therefore, the parameters of the modified Poisson model are the full adjustment factors.

$$\sigma = -\ln Y/\lambda_e$$

Additionally, the value of the full adjustment factor is affected by the yield rate influence factor. In the yield rate prediction method for manufacture of integrated circuit wafer provided by the disclosure, the yield rate influence factor includes the number of mask layers, chip area, and minimum line width of the reference product.

Furthermore, according to the Poisson model for yield rate and defect density (number of defects), regression analysis is performed on the full adjustment factor to obtain the full adjustment factor linear regression equation σ as:

$$\sigma = -\ln Y/\lambda_e f(X_1, \quad X_2, \quad X_3, \quad . \quad . \quad . \quad = b + k_1 X_1 + k2 X_2 + k3 X_3 + . . . .$$ In the equation, b is a constant term; $X_1$, $X_2$, and $X_3$ are respectively the variable terms $$\frac{N}{N_e}, \frac{A}{A_e}, \text{ and } \frac{W_e}{W}$$

related to each of the yield rate influence factors.

$$\frac{N}{N_e}$$

is the variable term corresponding to the ratio of the number of mask layers N of the current product to the number of mask layers $N_e$ of the reference product.

$$\frac{A}{A_e}$$

is the variable term corresponding to the ratio of the chip area A of the current product to the chip area $A_e$ of the reference product.

$$\frac{W_e}{W}$$

is the variable term corresponding to the ratio of the minimum line width $W_e$ of the reference product to the minimum line width W of the current product.

$k_1$ is the linear regression coefficient corresponding to variable $X_1$, $k_2$ is the linear regression coefficient corresponding to variable $X_2$, $k_3$ is the linear regression coefficient corresponding to variable $X_3$.

A full adjustment factor linear regression equation based on each of the candidate reference products can be obtained respectively according to the full adjustment factor linear regression model 6.

FIG. 3 is a screenshot of the yield rate prediction program in the manufacture of integrated circuit wafers of the disclosure.

As shown in FIG. 3, in some embodiments, linear regression analysis is performed on the product 1, product 2 . . . product 10, and the full adjustment factor linear regression equation of each of the candidate reference products (product 1, product 2 . . . product 10) is obtained.

Candidate reference product parameter acquisition module 120: each of the yield rate influence factors of each of the candidate reference products is obtained respectively.

In the yield rate prediction program in the manufacture of integrated circuit wafer of the disclosure, the yield rate influence factor includes the number of mask layers, chip area, and minimum line width of the reference product, as shown in Table 1 below. In some embodiments, each of the candidate reference products (product 1, product 2 . . . product 10) has a different number of mask layers N, chip area A, and minimum line width W.

TABLE 1

Yield rate influence factor statistics of each of the candidate
reference products in the reference product library

| product | number of mask layers | chip area cm$^2$ | minimum line width μm | average yield rate |
|---------|----------------------|------------------|----------------------|--------------------|
| 1 | 11 | 0.1533 | 1.0 | 95.6% |
| 2 | 10 | 0.1879 | 0.8 | 90.2% |
| 3 | 12 | 0.2053 | 0.8 | 87.4% |
| 4 | 14 | 0.0894 | 0.6 | 82.5% |
| 5 | 10 | 0.1469 | 0.7 | 90.8% |
| 6 | 13 | 0.1376 | 1.0 | 93.5% |
| 7 | 12 | 0.1091 | 0.6 | 84.2% |
| 8 | 11 | 0.1695 | 0.8 | 91.4% |
| 9 | 12 | 0.1448 | 0.6 | 87.4% |
| 10 | 11 | 0.1986 | 0.7 | 85.9% |

Candidate reference product function acquisition module 130: a full coordination factor linear function of each of the candidate reference products and a modified yield rate prediction model based on each of the candidate reference products are obtained respectively according to the respective yield rate influence factors and the full adjustment factor linear regression equation.

Since the product yield rate of wafer manufacturing is related to the product process parameters such as the number of mask layers N, the chip area A, and the minimum line width W of the product, the full adjustment factor linear regression equation σ can also be expressed as follows:

$$\sigma = -\ln Y / \lambda_e$$

$$= f\left(\frac{N}{N_e}, \frac{A}{A_e}, \frac{W_e}{W}, \dots\right)$$

$$= b + k_1\left(\frac{N}{N_e}\right) + k_2\left(\frac{A}{A_e}\right) + k_3\left(\frac{W_e}{W}\right) + \dots$$

Therefore, for each of the candidate reference products in the reference product library, after the yield rate influence factor of each of the candidate reference products is substicandidate reference products can be obtained according to the full adjustment factor linear regression equation:

$$\hat{Y}_i e^{-\sigma_i \lambda_e} = e^{\sigma_i \ln Y}_3$$

In the equation, $\hat{Y}_1$ is the predicted yield rate of a product i based on the candidate reference product e, $\sigma_i$ is the full adjustment factor of the product i based on the candidate reference product e, and $Y_e$ the actual production yield rate of the candidate reference product e.

Candidate reference product prediction module 140: the predicted yield rate of each of other candidate reference products is obtained from each of the modified yield rate prediction models based on the current candidate reference product. The overall yield rate error value based on each of the candidate reference products is obtained respectively according to the second preset rule. The full coordination factor linear function correlation coefficient based on each of the candidate reference products is obtained according to the third preset rule.

As mentioned above, for example, the full adjustment factor linear function σ of product 9 is substituted into the modified yield rate prediction model of each of the candidate reference products to obtain the modified yield rate prediction model corresponding to the product 9.

$$\hat{Y}_i = e^{-\sigma_9 \lambda_e}$$

$$= e^{\left(-3.23123 + 1.57379\left(\frac{N_i}{12}\right) + 0.58412\left(\frac{A_i}{0.1448}\right) + 2.45954\left(\frac{0.6}{W_i}\right)\right) \ln Y_e}$$

In some embodiments, based on the modified yield rate prediction model, the corresponding parameters of other products in the product library are substituted into the modified yield rate prediction model using product 9 as the reference product, thereby obtaining the predicted yield rate of other products corresponding to product 9 as the reference product. The predicted yield rate and actual yield rate value of the corresponding products in the reference library of other products are shown in Table 2 below.

TABLE 2

Yield rate prediction statistics of other candidate reference
products based on the final reference product

| Product | 1 | 2 | 3 | 4 | 5 | 6 | 7 | 8 | 10 |
|---------|-----|-----|-----|-----|-----|-----|-----|-----|-----|
| Average yield rate | 95.6% | 90.2% | 87.4% | 82.5% | 90.8% | 93.5% | 84.2% | 91.4% | 85.9% |
| Predicted yield rate | 96.0% | 91.2% | 87.2% | 82.5% | 90.0% | 93.4% | 84.6% | 90.5% | 86.0% | tuted in the equation, the full coordination factor linear function of corresponding modified Poisson model can be obtained. For example, in some embodiments, the full coordination factor linear function 6 of the product 9 is:

$$\sigma_i = f\left(\frac{N_i}{N_e}, \frac{A_i}{A_e}, \frac{W_e}{W_i}\right)$$

$$= -3.23123 + 1.57379\left(\frac{N_i}{12}\right) + 0.58412\left(\frac{A_i}{0.1448}\right) + 2.45954\left(\frac{0.6}{W_i}\right)$$

In addition, in the yield rate prediction method for manufacture of integrated circuit wafer provided by the disclosure, the modified yield rate prediction model of each of the As shown above in the table, the overall yield rate error value based on each of the candidate reference products is further obtained respectively according to the second preset rule. The second preset rule includes: the overall yield rate error value d based on the current candidate reference product is:

$$d = \sqrt{\frac{1}{N}\sum_{i=1}^{N}(z_i - \mu)^2} = \sqrt{\frac{1}{N}\sum_{i=1}^{N}\left(\left(\hat{Y}_i - Y_i\right) - \frac{1}{N}\sum_{i=1}^{N}\left|\hat{Y}_i - Y_i\right|\right)^2}$$

In the equation, N is the total quantity of other candidate reference products, $z_i$ is the difference between the predicted yield rate $\hat{Y}_i$ and actual yield rate $Y_i$ of other candidate reference products i, and $\mu$ is the total average value of the difference between the respective predicted yield rates and actual yield rates of all the other candidate reference products.

The overall yield rate error value of each of the candidate reference products is obtained in turn. As shown below in Table 3. Taking the product 9 as an example, the average yield rate and predicted yield rate of each of other candidate reference products are substituted into the above equation, and it is obtained that the overall yield rate error value is 0.00587.

TABLE 3

σ-function regression analysis and overall yield rate
error statistics of each of the candidate reference products

| reference products | σ function correlation | overall yield rate error value |
|---|---|---|
| 1 | 0.83116 | 0.01457 |
| 2 | 0.89431 | 0.38583 |
| 3 | 0.88319 | 0.01448 |
| 4 | 0.86024 | 0.01327 |
| 5 | 0.88083 | 0.01449 |
| 6 | 0.86744 | 0.01436 |
| 7 | 0.82692 | 0.01638 |
| 8 | 0.88024 | 0.01438 |
| 9 | 0.98248 | 0.00587 |
| 10 | 0.88549 | 0.01405 |

In addition, the full coordination factor linear function correlation coefficient based on each of the candidate reference products can also be obtained according to the third preset rule. Correlation is the correlation coefficient value $R^2$ of the regression analysis model corresponding to this product as the reference product. In statistics, the correlation coefficient $R^2$ closer to 1 indicates that the model is more similar to the real situation.

The third preset rule includes: the full coordination factor linear function correlation coefficient $R^2$ based on each of the candidate reference products is $$R^2 = 1 - \frac{\sum_{i=1}^{N} (\hat{Y}_i - Y_i)^2}{\sum_{i=1}^{N} (Y_i - \overline{Y})^2}$$

In the equation, the average value of the actual yield rate of all the other candidate reference products is $$\overline{Y} = \frac{1}{N} \sum_{i=1}^{N} Y_i.$$

Through the above steps, the full coordination factor linear function correlation coefficient of each of the candidate reference products is obtained in turn, as shown above in Table 3. Taking product 9 as an example, the respective average yield rates and predicted yield rates of each of other candidate reference products are substituted into the above equation, and it is obtained that the full coordination factor linear function correlation coefficient thereof is 0.98248.

Final reference product selecting module 150: the candidate reference product that minimizes the yield rate error value of the other candidate reference products is selected as the reference product.

In some embodiments, it can be obtained from Table 3 that, the overall yield rate error value corresponding to product 9 in the reference product library is the smallest, which is 0.00587, and the correlation coefficient value $R^2$ is 0.98248, which is close to 1, indicating that the correlation is high. As the final reference product, it can be used for yield rate prediction of new products.

New product prediction model acquisition module 160: a new product prediction model based on the final reference product is obtained according to the full adjustment factor linear function σ based on the final reference product.

In some embodiments, when the ninth product is selected as the reference product, the corresponding full adjustment factor linear function σ in manufacture of semiconductor wafer is:

$$\sigma_i = f\left(\frac{N_i}{N_e}, \frac{A_i}{A_e}, \frac{W_e}{W_i}\right)$$

$$= -3.23123 + 1.57379\left(\frac{N_i}{12}\right) + 0.58412\left(\frac{A_i}{0.1448}\right) + 2.45954\left(\frac{0.6}{W_i}\right)$$

Then the new product prediction model is:

$$Y_i = e^{-\sigma_i \lambda_e}$$

$$= e^{\left(-3.23123 + 1.57379\left(\frac{Ni}{12}\right) + 0.58412\left(\frac{Ai}{0.1448}\right) + 2.45954\left(\frac{0.6}{Wi}\right)\right) \ln 0.874}$$

New product yield rate prediction module 170: a new product yield rate prediction result is obtained according to the new product yield rate prediction model.

In some embodiments, the yield rate prediction result of new product can be obtained according to the new product yield rate prediction model and the yield rate influence factor of the new product, thereby evaluating the level of yield rate that can be achieved by the new product on the semiconductor wafer manufacturing line.

Specifically, the number of mask layers of the new product is 14, the minimum line width is 0.8 um, and the chip area is 0.25 cm$^2$, then the corresponding full adjustment factor of the new product on the wafer manufacturing line is s. It can be obtained from the above equation that the full adjustment factor of the new product is s=0.59554. The predicted yield rate value corresponding to the new product is:

$$Y = e^{-\sigma \lambda_e} e^{94 \ln Y_e} = e^{0.59554 \times 0.13467} = 0.92293 \approx 92.3\%$$

Furthermore, an embodiment of the disclosure further provides a computer-readable storage medium, and the computer-readable storage medium stores a yield rate prediction program in the manufacture of integrated circuit wafers. The following operations are realized when the yield rate prediction program in the manufacture of integrated circuit wafers is executed by the processor:

Obtaining candidate reference product models: a first quantity of candidate reference products are selected from a reference product library, and the full adjustment factor linear regression equation based on each of the candidate reference products is obtained according to a first preset rule;

Obtaining parameters of the candidate reference products: each of yield rate influence factors of each of the candidate reference products is obtained respectively;

Obtaining functions of candidate reference products: the full coordination factor linear function of each of the candidate reference products is obtained according to the respective yield rate influence factors and the full adjustment factor linear regression equation, and a yield rate prediction model is modified according to each of the candidate reference products;

Predicting candidate reference products: the predicted yield rate of each of other candidate reference products is obtained from each of the modified yield rate prediction models based on the current candidate reference product. The overall yield rate error value based on each of the candidate reference products is obtained according to a second preset rule. Full coordination factor linear function correlation coefficients based on each of the candidate reference products are obtained according to a third preset rule;

Selecting final reference product: The candidate reference product with the smallest overall yield rate error value or the full coordination factor linear function correlation coefficient closest to 1 is selected as the final reference product;

Obtaining a new product prediction model: a new product prediction model based on the final reference product is obtained according to a full adjustment factor linear function based on the final reference product;

Predicting yield rate of new product: a yield rate prediction result of new product is obtained according to the new product yield rate prediction model and the yield rate influence factor of the new product.

The specific implementation of the computer-readable storage medium of the disclosure is substantially the same as the specific implementation of the yield rate prediction method in the manufacture of integrated circuit wafers, and no further description is incorporated herein.

Function and Effect of Embodiment

The yield rate prediction method for manufacture of integrated circuit wafer involved in the embodiment is performed based on the functional relationship between random defect density and yield rate in wafer manufacturing. By referring to the yield rate data of mature products on the production line, establishing data model and performing regression analysis, selecting suitable reference products, and obtaining a new product prediction model, prediction on the yield rate of a new product can be carried out. The method of the disclosure uses the mature product database on the existing production line of the manufacturing plant as the basis of the yield rate prediction model. The data is real and reliable, and can achieve relatively accurate yield rate prediction values of new products, reflect the actual production capability of the semiconductor wafer manufacturing plant. The method of the disclosure can establish a corresponding yield rate prediction model based on the product database of different plants, and therefore the method is universal for semiconductor wafer manufacturing plants.

The foregoing embodiments are preferred examples of the disclosure, and are not used to limit the scope to be protected by the disclosure.

The sequence numbers of the above-mentioned embodiments of the disclosure are only for description, and do not represent the advantages and disadvantages of the embodiments.

The above are only preferred embodiments of the disclosure and do not limit the scope of the disclosure. Any equivalent structure or equivalent process transformation made by using the content of the description and drawings of the disclosure, or directly or indirectly applied to other related technical fields are equivalently involved in the scope to be protected by the disclosure.

What is claimed is:

1. A method for generating a yield rate prediction model for a new integrated circuit wafer product on a semiconductor production line, the method comprising:

(a) for each of a plurality of candidate reference products selected from a library of mature products having historical manufacturing data from the semiconductor production line, generating a respective modified yield rate prediction model based on a linear regression analysis of yield rate influence factors associated with the each candidate reference product;

(b) iteratively testing each modified yield rate prediction model by, using a processor, operating the each modified yield rate prediction model to predict the yield rates of the other candidate reference products in the plurality of candidate reference products;

(c) based on results of the iterative testing, selecting the modified yield rate prediction model that exhibits a lowest overall prediction error between the predicted yield rates and actual historical yield rates of the other candidate reference products or a highest correlation coefficient; and (d) generating the yield rate prediction model for the new integrated circuit wafer product based on the selected modified yield rate prediction model, wherein the generated model provides an improved, data-driven prediction of manufacturing yield for the new integrated circuit wafer product, thereby enabling more accurate initial cost and output value estimation prior to production of the new integrated circuit wafer product by the semiconductor production line.

2. The method according to claim 1, wherein generating the respective modified yield rate prediction model in step (a) is based on a first preset rule, and wherein the first preset rule is:

$$Y_e = e^{-\lambda_e},$$

wherein $Y_e$ is an actual yield rate of the candidate reference product e, and $\lambda_e$ is an average number of defects of wafer corresponding to the candidate reference product e.

3. The method according to claim 2, wherein the yield rate influence factor of step (a) comprises the number of mask layers, a chip area, and a minimum line width of the candidate reference product.

4. The method according to claim 3, wherein the linear regression analysis of step (a) utilizes a full adjustment factor linear regression equation σ that:

$$\sigma = -\ln Y/\lambda_e = f(X_1, X_2, X_3, \ldots) = b = b + k_1 X_1 + k_2 X_2 + k_3 X_3 + \ldots,$$

wherein b is a constant term,

X1, X2, and X3 are respectively variable terms $$\frac{N}{N_e}, \frac{A}{A_e}, \text{ and } \frac{W_e}{W}$$

related to the each of the yield rate influence factors, $$\frac{N}{N_e}$$

is a variable term corresponding to a ratio of the number of mask layers N of a current product to the number of mask layers Ne of the reference product, $$\frac{A}{A_e}$$

is a variable term corresponding to a ratio of a chip area A of the current product to a chip area Ae of the reference product, $$\frac{W_e}{W}$$

is a variable term corresponding to a ratio of the minimum line width We of the reference product to a minimum line width W of the current product, k₁ is a linear regression coefficient corresponding to the variable X1, k₂ is a linear regression coefficient corresponding to the variable X2, and k₃ is a linear regression coefficient corresponding to the variable X3.

5. The method according to claim 4, wherein the full adjustment factor linear regression equation defines a full coordination factor linear function as:

$$\sigma = -\ln Y / \lambda_e$$
$$= f\left(\frac{N}{N_e}, \frac{A}{A_e}, \frac{W_e}{W}, \cdots \right)$$
$$= b + k_1\left(\frac{N}{N_e}\right) + k_2\left(\frac{A}{A_e}\right) + k_3\left(\frac{W_e}{W}\right) + \cdots .$$

6. The method according to claim 1, wherein the modified yield rate prediction model of step (a) is defined as:

$$\hat{Y}_i = e^{-\sigma_i \lambda_e} = e^{\sigma_i \ln Y_e},$$

wherein $\hat{Y}_i$ is a predicted yield rate of a product i based on the candidate reference product e, $\sigma_i$ is a full adjustment factor of the product i based on the candidate reference product e, and $Y_e$ is an actual production yield rate of the candidate reference product e.

7. The method according to claim 6, wherein the overall prediction error in step (c) is calculated as an overall yield rate error value d based on a second preset rule, wherein the second preset rule is:

$$d = \sqrt{\frac{1}{N}\sum_{i=1}^{N}(z_i - \mu)^2} = \sqrt{\frac{1}{N}\sum_{i=1}^{N}\left((\hat{Y}_i - Y_i) - \frac{1}{N}\sum_{i=1}^{N}|\hat{Y}_i - Y_i|\right)^2},$$

wherein N is a total quantity of the other candidate reference products, $z_i$ is a difference between the predicted yield rate $\hat{Y}_i$ and an actual yield rate $Y_i$ of the other candidate reference products i, and μ is a total average value of the difference between the respective predicted yield rates and the actual yield rates of all the other candidate reference products.

8. The method according to claim 7, wherein the selection in step (c) is alternatively based on a third preset rule comprising the full coordination factor linear function correlation coefficient R based on the each of the candidate reference products, wherein the third preset rule is:

$$R = \sqrt{1 - \frac{\sum_{i=1}^{N}(\hat{Y}_i - Y_i)^2}{\sum_{i=1}^{N}(Y_i - \overline{Y})^2}},$$

wherein an average value of an actual yield rate of all the other candidate reference products is:

$$\overline{Y} = \frac{1}{N}\sum_{i=1}^{N} Y_i.$$

9. An electronic device, comprising: a memory and a processor, wherein the memory stores a program for generating a yield rate prediction model for a new integrated circuit wafer product on a semiconductor production line, and wherein when the program is executed by the processor, the following steps are implemented:

(a) for each of a plurality of candidate reference products selected from a library of mature products having historical manufacturing data from the semiconductor production line, generating a respective modified yield rate prediction model based on a linear regression analysis of yield rate influence factors associated with the each candidate reference product;

(b) iteratively testing each modified yield rate prediction model by, using a processor, operating the each modified yield rate prediction model to predict the yield rates of the other candidate reference products in the plurality of candidate reference products;

(c) based on results of the iterative testing, selecting the modified yield rate prediction model that exhibits a lowest overall prediction error between the predicted yield rates and actual historical yield rates of the other candidate reference products or a highest correlation coefficient; and (d) generating the yield rate prediction model for the new integrated circuit wafer product based on the selected modified yield rate prediction model, wherein the generated model provides an improved, data-driven prediction of manufacturing yield for the new integrated circuit wafer product, thereby enabling more accurate initial cost and output value estimation prior to production of the new integrated circuit wafer product by the semiconductor production line.

10. A non-transitory computer-readable storage medium, storing a program for generating a yield rate prediction model for a new integrated circuit wafer product on a semiconductor production line, wherein when the program is executed by a processor, the steps of the method claimed in claim 1 are realized.

* * * * *